United States Patent
Osborne

(10) Patent No.: US 11,883,983 B2
(45) Date of Patent: Jan. 30, 2024

(54) FORMING TOOLS THAT MIX MULTI-PART RESIN FOR COMPOSITE PARTS

(71) Applicant: The Boeing Company, Chicago, IL (US)

(72) Inventor: Max Osborne, Melbourne (AU)

(73) Assignee: The Boeing Company, Chicago, IL (US)

( * ) Notice: Subject to any disclaimer, the term of this patent is extended or adjusted under 35 U.S.C. 154(b) by 1219 days.

(21) Appl. No.: 16/276,577

(22) Filed: Feb. 14, 2019

(65) Prior Publication Data

US 2020/0262106 A1 Aug. 20, 2020

(51) Int. Cl.
| | | |
|---|---|---|
| B29B 7/74 | (2006.01) | |
| B29B 7/60 | (2006.01) | |
| B29B 7/72 | (2006.01) | |
| B29C 70/30 | (2006.01) | |
| B29L 31/30 | (2006.01) | |
| B29K 101/10 | (2006.01) | |

(52) U.S. Cl.
CPC ............ *B29B 7/7471* (2013.01); *B29B 7/603* (2013.01); *B29B 7/726* (2013.01); *B29B 7/728* (2013.01); *B29C 70/30* (2013.01); *B29K 2101/10* (2013.01); *B29L 2031/30* (2013.01)

(58) Field of Classification Search
CPC ....... B29C 45/02; B29C 70/30; B29B 7/7471; B29B 7/726; B29B 7/728
See application file for complete search history.

(56) References Cited

U.S. PATENT DOCUMENTS

| | | | | |
|---|---|---|---|---|
| 7,939,011 B2* | 5/2011 | Young | .................. | B29C 70/443 |
| | | | | 425/389 |
| 8,652,371 B2* | 2/2014 | Smith | .................. | B29C 70/544 |
| | | | | 264/241 |
| 8,916,076 B2* | 12/2014 | Mathon | .................. | B29C 70/48 |
| | | | | 425/546 |
| 10,786,957 B2* | 9/2020 | Lutz | ........................ | B29C 33/02 |
| 2010/0283180 A1* | 11/2010 | De Vita | .................. | B29C 70/48 |
| | | | | 264/258 |

(Continued)

FOREIGN PATENT DOCUMENTS

| | | |
|---|---|---|
| CN | 101367267 A | 2/2009 |
| CN | 101585238 A | 11/2009 |

(Continued)

OTHER PUBLICATIONS

Engel (English Translation of DE202017001995U1) (Year: 2018).*

(Continued)

*Primary Examiner* — Matthew J Daniels
*Assistant Examiner* — Hana C Page
(74) *Attorney, Agent, or Firm* — Yee & Associates, P.C.

(57) ABSTRACT

Systems and methods are provided for mixing parts of a thermoset resin during impregnation of a composite preform. One embodiment is a method that includes positioning a composite preform at a forming tool, flowing a first part of the thermoset resin into a mixing chamber at the forming tool, flowing a second part of the thermoset resin that is chemically distinct from the first part of the thermoset resin into the mixing chamber, mixing the first part and the second part to form the thermoset resin within the mixing chamber, and infusing the thermoset resin from the mixing chamber into the preform.

23 Claims, 15 Drawing Sheets

(56) References Cited

U.S. PATENT DOCUMENTS

| | | | | |
|---|---|---|---|---|
| 2012/0043704 A1* | 2/2012 | Hawkins | ............... | B29C 70/549 |
| | | | | 264/511 |
| 2012/0313290 A1* | 12/2012 | Steinbichler | .......... | B29B 7/7485 |
| | | | | 425/130 |
| 2017/0305076 A1* | 10/2017 | Bem | ....................... | B29C 45/02 |
| 2018/0215111 A1* | 8/2018 | Lutz | ..................... | B29C 70/443 |

FOREIGN PATENT DOCUMENTS

| | | | |
|---|---|---|---|
| CN | 102015264 | A | 4/2011 |
| CN | 107000335 | A | 8/2017 |
| CN | 108058404 | A | 5/2018 |
| CN | 108454137 | A | 8/2018 |
| DE | 202017001995 | U1 | 2/2018 |
| JP | 2008174605 | A | 7/2008 |

OTHER PUBLICATIONS

Hill (English Translation of EP0938966). (Year: 2002).*
Kemtrak DCP007 Photometer (UV-VIS-NIR)-Industrial in-line analyzer for concentration and color control; http://www.kemtrak.com/products_DCP007; Dec. 10, 2018.
Stamixco; Plastic Disposable 2k Static Mixers for Viscous Materials; http://www.stamixco-usa.com/plastic-disposable; Dec. 10, 2018.
Stamixco; X-Grid Static Mixer (Type GX) for Viscous Material Processing; http://www.stamixco-usa.com/x-grid; Dec. 10, 2018.
China National Intellectual Property Administration, First Notification of Office Action and English Translation, dated Mar. 24, 2023, regarding Application No. CN202010041258.1, 18 pages.

* cited by examiner

FORMING TOOLS THAT MIX MULTI-PART RESIN FOR COMPOSITE PARTS

FIELD

The disclosure relates to the field of composite materials, and in particular, to systems and devices that facilitate layup and curing for composite parts.

BACKGROUND

Composite parts may be fabricated by laying up a preform comprising layers of fiber reinforced material onto a forming tool having a desired shape. During layup, the preform exists in a "dry" state where it has not yet been wetted with a resin. The preform is then impregnated with resin and the resin is hardened, resulting in a composite part.

A thermoset resin may be hardened by heating the resin to a curing temperature. At the curing temperature, chemical reactions within the resin are accelerated to the point where hardening takes place in a matter of minutes. At room temperature the chemical reactions still exist, but at a significantly reduced rate that enables the thermoset resin to be worked and handled before it hardens.

If a substantial volume of a thermoset resin is left idle, ongoing chemical reactions within the volume may heat it. This increases the temperature of the volume, which results in an increase in the rate of the chemical reaction. The increased rate of reaction generates more heat at the volume in a continuing cycle, resulting in exothermic runaway and premature curing. Because large volumes of thermoset resin may not be held in an idle state for later use without encountering exothermic runaway, the amount of thermoset resin which may be stored for injection into a preform is limited. This in turn limits the size of preforms that may be impregnated with resin and cured into composite parts.

Therefore, it would be desirable to have a method and apparatus that take into account at least some of the issues discussed above, as well as other possible issues.

SUMMARY

Embodiments described herein provide just-in-time mixing systems, which mix multiple liquid components ("parts") together to form a thermoset resin. When physically mixed to form the thermoset resin, chemical reactions at the thermoset resin enable it to harden into a solid. By mixing the parts of the thermoset resin together immediately before application of the resin to a preform, no large volume of thermoset resin is left idle during layup and forming. Hence, exothermic runaway of thermoset resin is prevented.

One embodiment is a method for mixing parts of a thermoset resin during impregnation of a composite preform. The method includes positioning a composite preform at a forming tool, flowing a first part of the thermoset resin into a mixing chamber at the forming tool, flowing a second part of the thermoset resin that is chemically distinct from the first part of the thermoset resin into the mixing chamber, mixing the first part and the second part to form the thermoset resin within the mixing chamber, and infusing the thermoset resin from the mixing chamber into the preform.

A further embodiment is a method for infusing a preform with a thermoset resin. The method includes driving multiple chemically distinct parts from separate storage wells towards a mixing chamber, mixing the multiple chemically distinct parts together to form the thermoset resin within the mixing chamber, and infusing a wavefront of the thermoset resin out of the mixing chamber and into the preform.

A further embodiment is a non-transitory computer readable medium embodying programmed instructions which, when executed by a processor, are operable for performing a method for mixing parts of a thermoset resin during impregnation of a composite preform. The method includes positioning a composite preform at a forming tool, flowing a first part of the thermoset resin into a mixing chamber at the forming tool, flowing a second part of the thermoset resin that is chemically distinct from the first part of the thermoset resin into the mixing chamber, mixing the first part and the second part to form the thermoset resin within the mixing chamber, and infusing the thermoset resin from the mixing chamber into the preform.

Yet another embodiment is a system for mixing parts of a thermoset resin during impregnation of a composite preform. The system includes a forming tool, which includes a mandrel defining a shape for the composite preform, a first storage well that stores a first part of the thermoset resin, a second storage well that stores a second part of the resin which is chemically distinct from the first part of the resin, a mixing chamber, a first channel leading from the first storage well to the mixing chamber, and a second channel leading from the second storage well to the mixing chamber.

Other illustrative embodiments (e.g., methods and computer-readable media relating to the foregoing embodiments) may be described below. The features, functions, and advantages that have been discussed can be achieved independently in various embodiments or may be combined in yet other embodiments further details of which can be seen with reference to the following description and drawings.

DESCRIPTION OF THE DRAWINGS

Some embodiments of the present disclosure are now described, by way of example only, and with reference to the accompanying drawings. The same reference number represents the same element or the same type of element on all drawings.

DESCRIPTION

The figures and the following description provide specific illustrative embodiments of the disclosure. It will thus be appreciated that those skilled in the art will be able to devise various arrangements that, although not explicitly described or shown herein, embody the principles of the disclosure and are included within the scope of the disclosure. Furthermore, any examples described herein are intended to aid in understanding the principles of the disclosure, and are to be construed as being without limitation to such specifically recited examples and conditions. As a result, the disclosure is not limited to the specific embodiments or examples described below, but by the claims and their equivalents.

Composite parts, such as Carbon Fiber Reinforced Polymer (CFRP) parts, are initially laid-up in multiple layers that together are referred to as a preform or "composite preform." Individual fibers within each layer of the preform are aligned parallel with each other, but different layers may exhibit different fiber orientations in order to increase the strength of the resulting composite part along different dimensions. The preform may include a viscous resin that solidifies in order to harden the preform into a composite part (e.g., for use in an aircraft). Carbon fiber that has been impregnated with an uncured thermoset resin or a thermoplastic resin is referred to as "prepreg." Other types of carbon fiber include "dry fiber" which has not been impregnated with resin but may include a tackifier or binder. Dry fiber may be infused with resin prior to hardening. For thermoset resins, the hardening is a one-way process referred to as curing, while for thermoplastic resins, the resin may reach a viscous form if it is re-heated.

Figure 1:
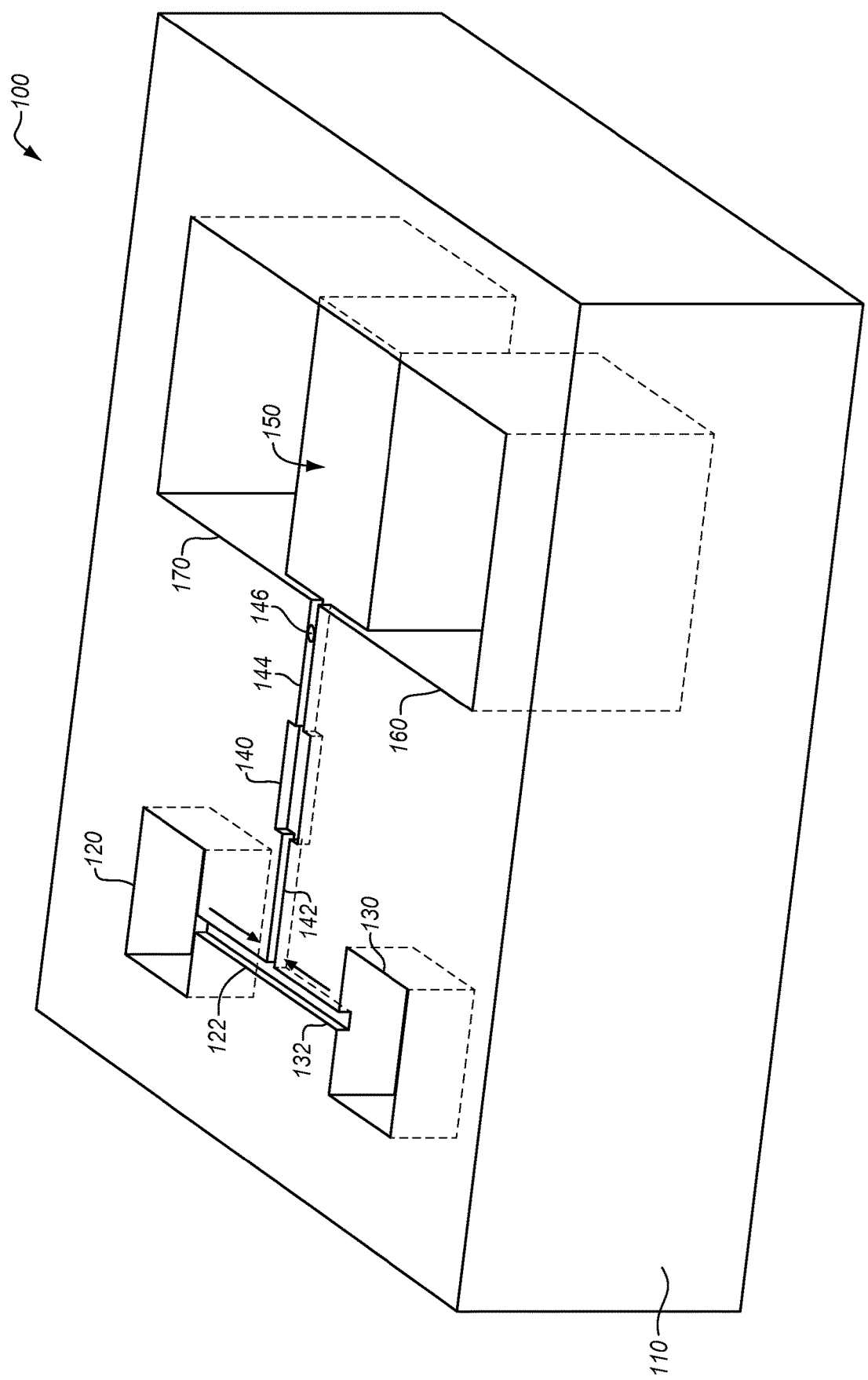
FIG. 1 illustrates a forming tool for fabricating a composite part in an illustrative embodiment.

FIG. 1 illustrates a forming tool 100 for fabricating a composite part in an illustrative embodiment. Forming tool 100 comprises any system, device, or component operable to define a shape for a dry fiber preform, and to impregnate the preform with curable resin in response to applied vacuum pressure. In this embodiment, forming tool 100 includes a body 110 that defines multiple storage wells. Body 110 may be made from steel or any other material that remains rigid at a curing temperature for the thermoset resin (e.g., several hundred degrees Fahrenheit). The storage wells at body 110 are each configured to store a different part of a thermoset resin. Specifically, first storage well 120 is configured to store a first part of the thermoset resin, and second storage well 130 is configured to store a second part of the thermoset resin. These parts will be mixed together "just in time" into a resin which will be used to infuse a preform. Specifically, after the parts from the storage wells travel through channel 122 and channel 132, they both enter channel 142 and proceed into a mixing chamber 140. When the parts are combined within the mixing chamber 140, they form the thermoset resin. The thermoset resin proceeds via channel 144 through a sensor 146 (e.g., an optical sensor, temperature sensor or laser sensor) to a preform laid-up at mandrel 150. The thermoset resin impregnates the preform, and is cured (e.g., via the application of heat) to harden the preform into a composite part. Forming tool 100 also includes volume 160 and volume 170, which may be designed together with mandrel 150 to form the preform into a desired shape.

The forming tool described above provides a technical benefit because it does not store large volumes of thermoset resin which could trigger exothermic runaway, but rather mixes parts together into a resin just before infusion takes place. Hence, a technician fabricating a composite part via forming tool 100 is not limited by time constraints stemming from exothermic runaway concerns.

Illustrative details of the operation of forming tool 100 will be discussed with regard to FIG. 2. Assume, for this embodiment, that a technician has acquired forming tool 100, and will be fabricating a composite part via forming tool 100.

Figure 2:
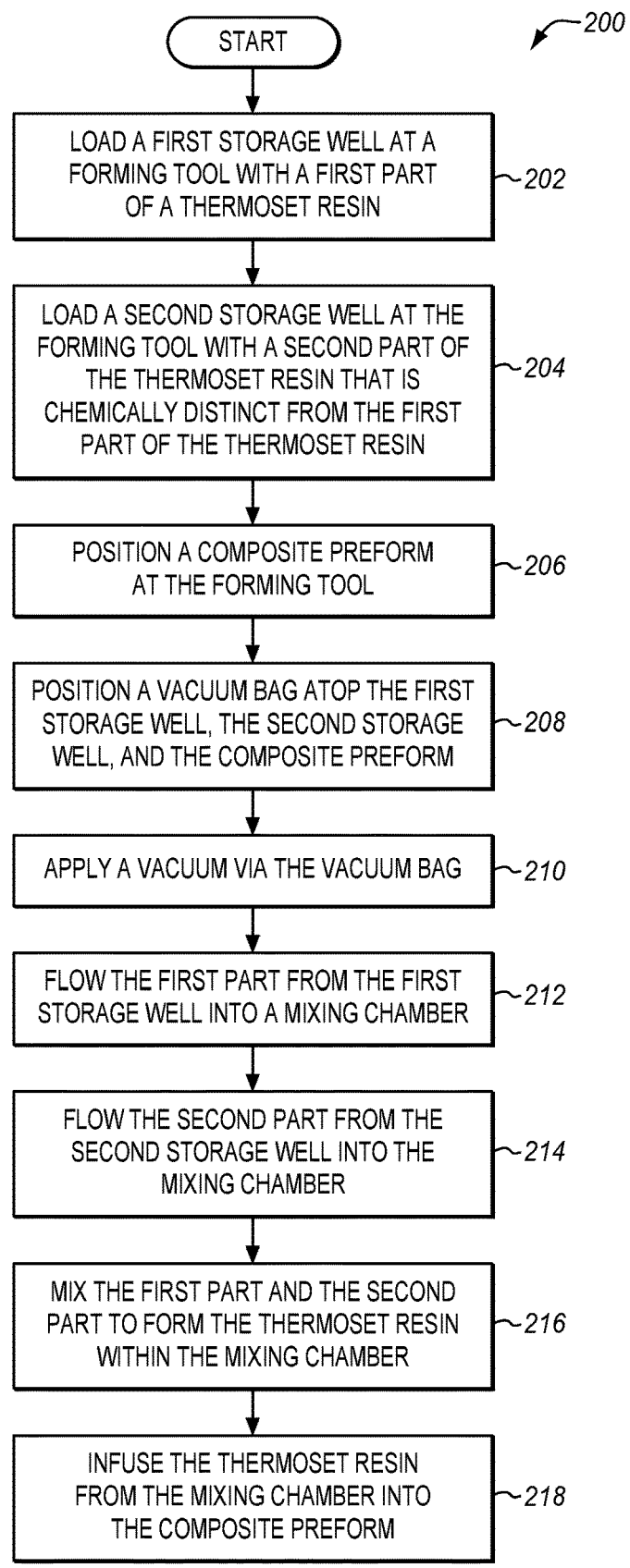
FIG. 2 is a flowchart illustrating a method for utilizing a forming tool to fabricate a composite part in an illustrative embodiment.

FIG. 2 is a flowchart illustrating a method 200 for fabricating a composite part in an illustrative embodiment. The steps of method 200 are described with reference to forming tool 100 of FIG. 1, but those skilled in the art will appreciate that method 200 may be performed in other devices. The steps of the flowcharts described herein are not all inclusive and may include other steps not shown. The steps described herein may also be performed in an alternative order.

Figure 3:
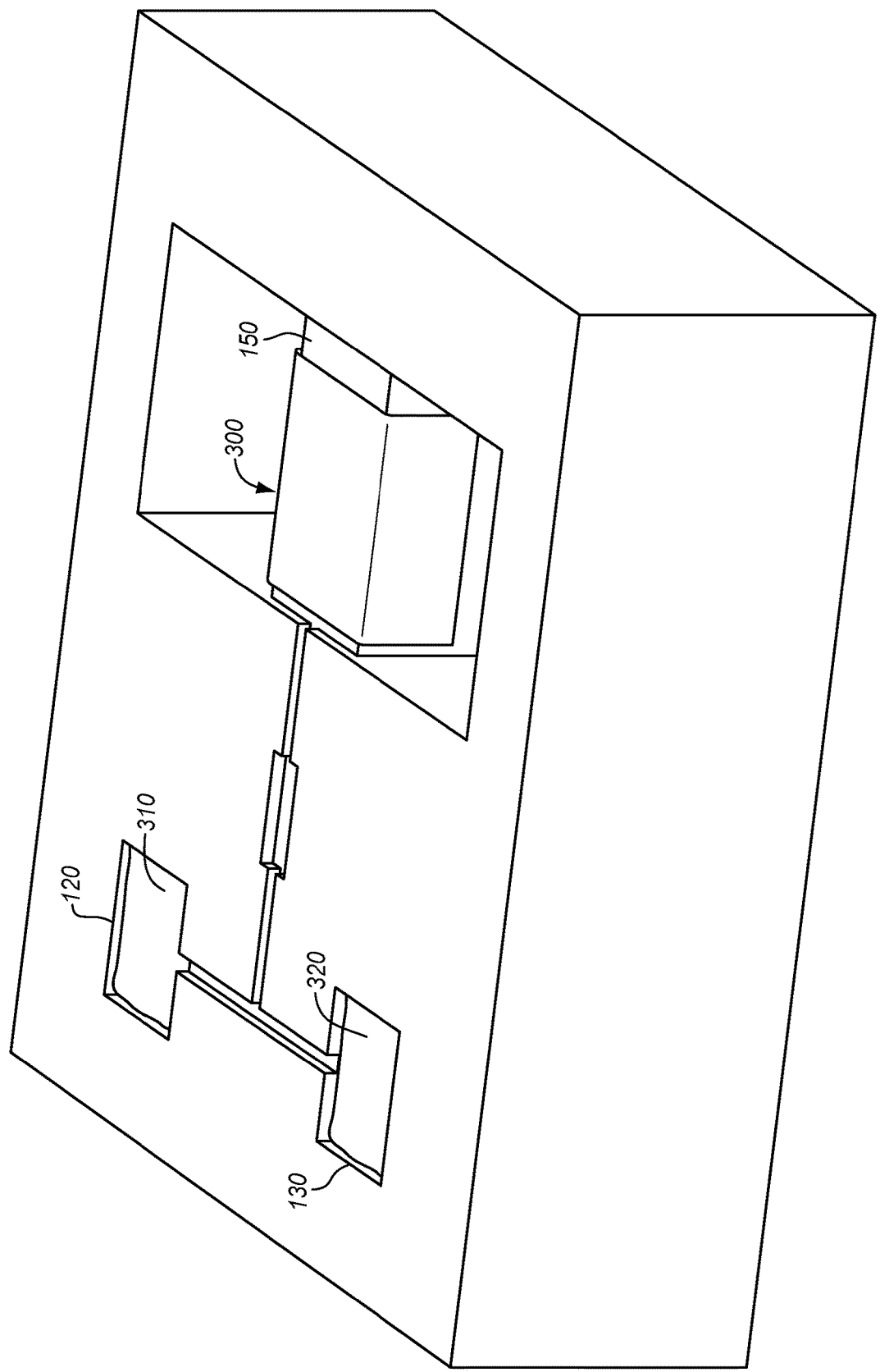
FIGS. 3-6 illustrate layup of a preform that will be hardened into a composite part in an illustrative embodiment.

In step 202, as shown in FIG. 3, the first storage well 120 is loaded with a first part 310 of a thermoset resin (e.g., a liquid suspension of monomers), and in step 204, the second storage well 130 is loaded with a second part 320 of the thermoset resin (e.g., a liquid hardener that catalyzes polymerization of the monomers). The second part 320 is chemically distinct from the first part 310. That is, the first part 310 and the second part 320 include a different combination of chemical constituents, which when combined result in a liquid thermoset resin.

In step 206, a composite preform 300 is positioned at the forming tool. For example, layers of composite preform 300 may be laid-up onto mandrel 150 as depicted in FIG. 3 in order to form a desired shape. In further embodiments, composite preform 300 may be laid-up at another location prior to being positioned at forming tool 100. In such cases, composite preform 300 may be transported to mandrel 150 and shaped into conformance with mandrel 150 (e.g., by operation of an automated robotic transport system or a technician). In further embodiments, the order of steps 202, 204, and 206 may be adjusted in any desired order with respect to each other.

Figure 4:
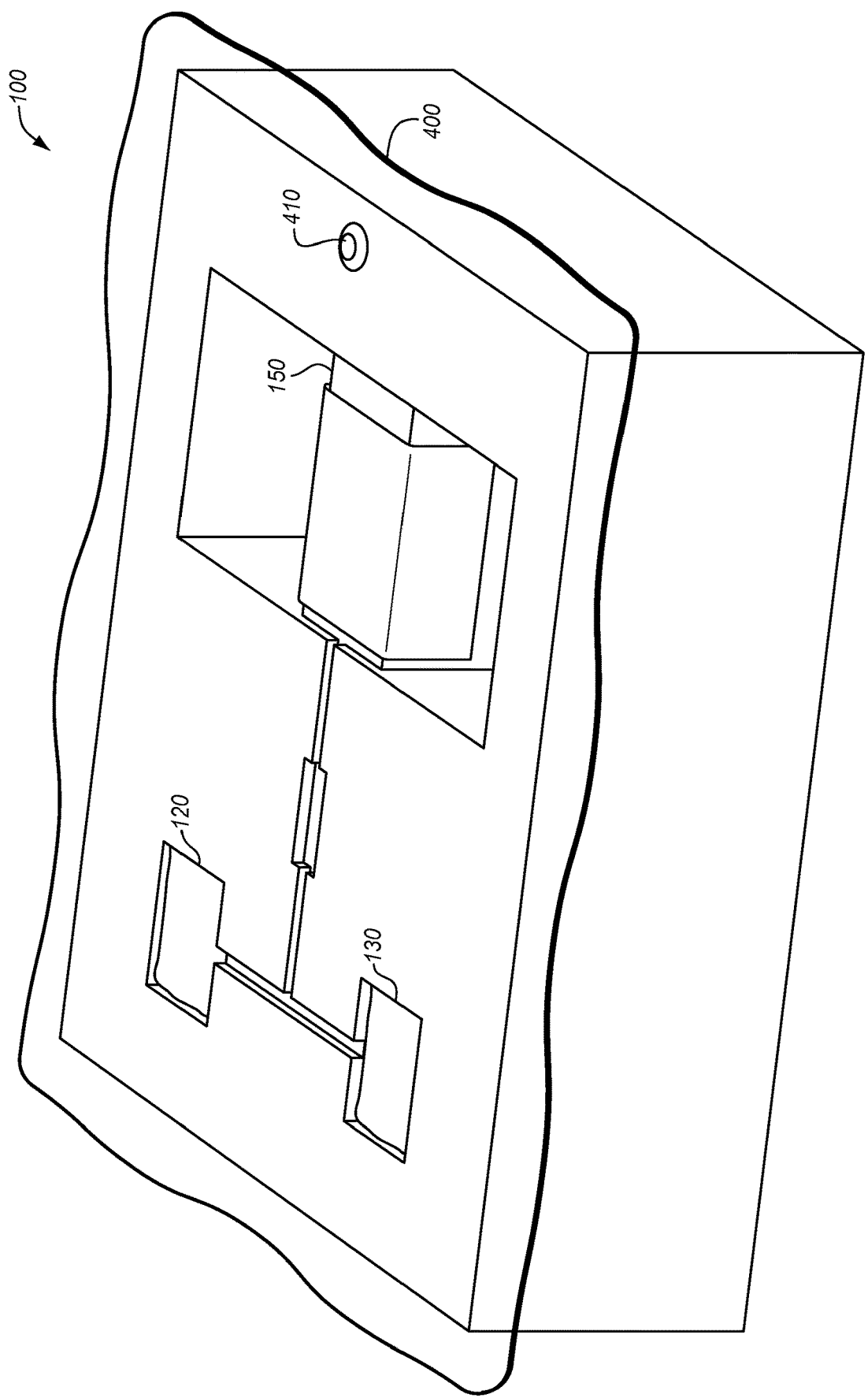

In step 208, a vacuum bag is positioned atop the first storage well 120, the second storage well 130, and the composite preform 300. For example, as shown in FIG. 4, vacuum bag 400 may be placed atop the entirety of forming tool 100. Vacuum bag 400 is made from a highly deformable material, such as polypropylene, which is capable of stretching in response to an applied vacuum. The vacuum bag 400 is further secured to body 110 (e.g., via tape or adhesive sealant) in order to form an airtight compartment enclosing the first storage well 120, second storage well 130, and mandrel 150. With vacuum bag 400 positioned in this manner, port 410 provides the only path via which gases and liquids may exit the forming tool 100.

Figure 5:
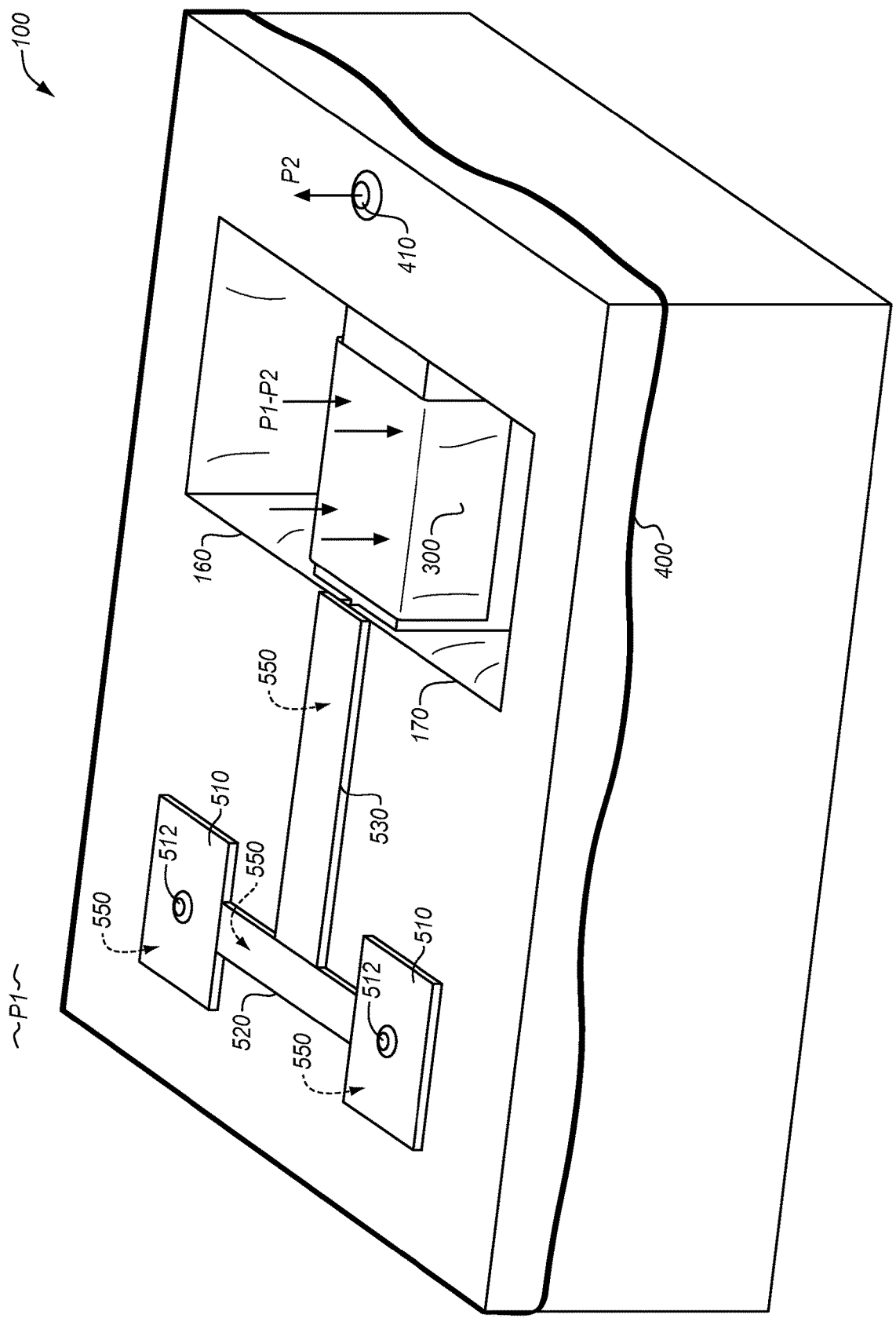

Further components may be placed atop the vacuum bag 400 after the vacuum bag 400 has been positioned and secured. For example, as shown in FIG. 5, cover plates 510 (having valves 512) may be placed over the storage wells and the vacuum bag 400. Additional cover plates, such as cover plate 520 and cover plate 530, may be positioned atop the vacuum bag 400 to cover channels in forming tool 100. The cover plates are sealed to vacuum bag 400, and prevent gas (e.g., air) in the surrounding environment from reaching any covered portions 550 of vacuum bag 400. The cover plates prevent infusion of resin from occurring while the vacuum bag is being used to compact the preform. Specifically, because the cover plates are sealed to the vacuum bag, they prevent ambient atmosphere from applying forces to the vacuum bag. This in turn prevents the vacuum bag from deforming in certain regions, which prevents the vacuum bag from entering the storage wells and pushing resin toward the preform.

In step 210, a vacuum (e.g., a pressure (P2) lower than surrounding environmental pressure (P1)) is applied to the vacuum bag 400 via port 410. The vacuum removes gas trapped between vacuum bag 400 and forming tool 100. As gas is removed, the difference in pressure (P1–P2) between the pressure P2 and the surrounding environmental pressure P1 deforms the vacuum bag 400 into conformance with the volume 160 and the volume 170, and also helps move gases/volatiles from the resin and away from the preform outside of the process. This action consolidates and further shapes the composite preform 300. Hence, step 210 may be considered a consolidation step wherein the preform is compressed but resin does not flow into the preform. During this process, the covered portions 550 of the vacuum bag 400 do not deform, because the cover plates shield the covered portions 550 from experiencing the surrounding environmental pressure P1. Hence, the vacuum bag does not push any resin out of the storage wells and on infusion occurs. Further details of these physical principles will be described with regard to step 212 and FIG. 7 below. After the composite preform 300 has been fully compacted, it is desirable to impregnate the composite preform 300 with resin.

Figure 6:
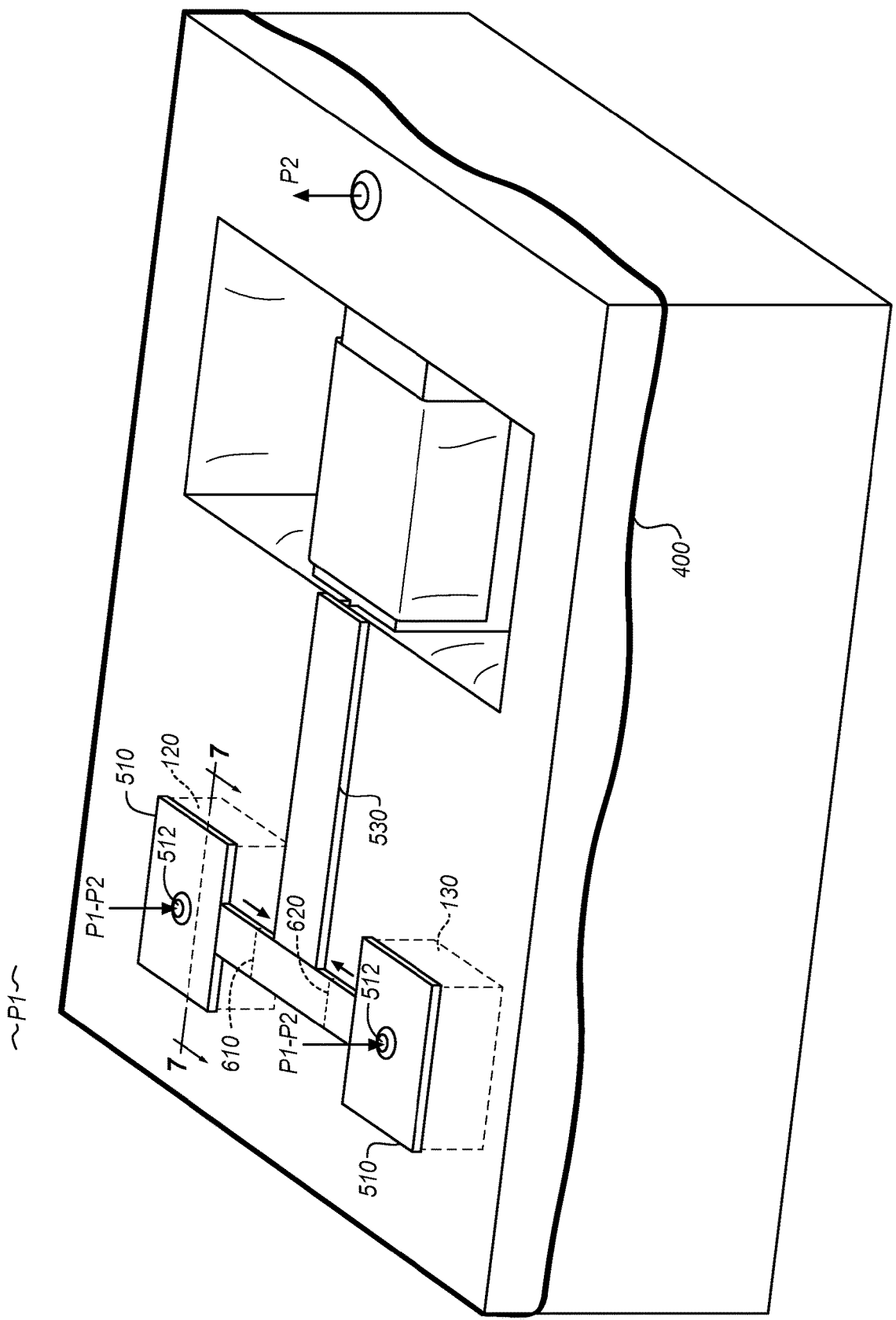

In step 212, infusion begins, and the first part 310 is flowed from the first storage well 120 into the mixing chamber 140, as shown by wavefront 610 of FIG. 6. This operation may be accomplished by opening a valve 512 at the cover plate 510 which covers the first storage well 120. Opening the valve 512 enables gas in the surrounding environment to apply pressure P1 against the portion of the vacuum bag 400 that is covered by the cover plate 510. In further embodiments, each of valves 512 is connected to an independently calibrated pressure source, such that the amount of pressure applied at each cover plate may be controlled.

In step 214, the second part 320 is flowed from the second storage well 130 into the mixing chamber 140, as shown by wavefront 620 of FIG. 6. This operation may be accomplished in a similar fashion to step 212 described above, and may be performed concurrently with step 212 above.

Figure 7:
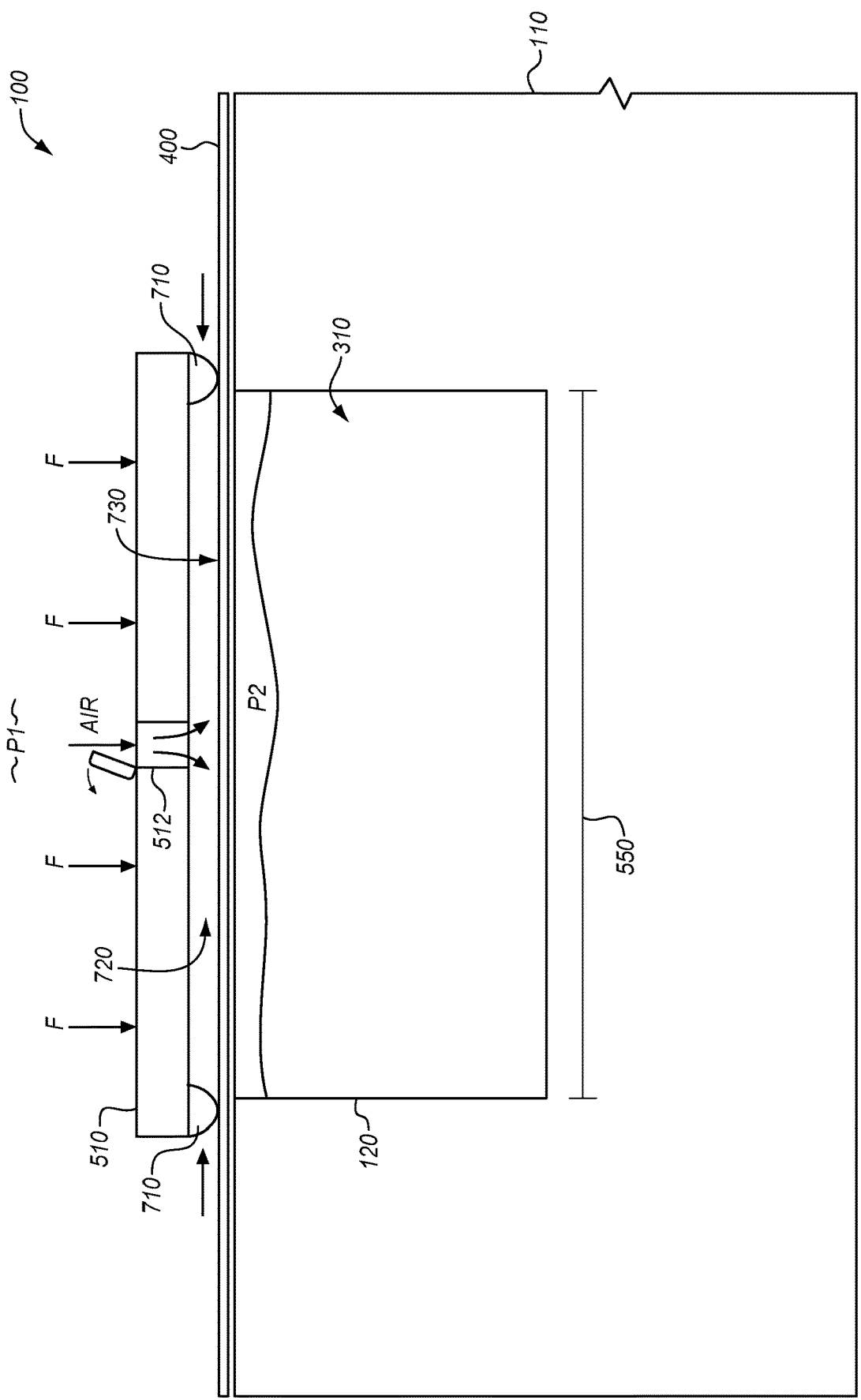
FIG. 7 is a cut-through view of a storage well that is capped by a cover plate in an illustrative embodiment.

FIG. 7 illustrates interactions between a cover plate 510 and a vacuum bag 400 in detail, and corresponds with view arrows 7 of FIG. 6. While cover plate 510 is sealed to vacuum bag 400, the seals 710 prevent air from entering a region 720. Hence, cover plate 510 absorbs forces (F) applied by air at surrounding environmental pressure, and the covered portion 550 of vacuum bag 400 experiences little or no deformation (i.e., because the difference in pressure between region 720 and P2 rapidly becomes de minimis). When valve 512 is opened, gas at pressure P1 (e.g. atmospheric pressure) enters region 720. The gas entering the region 720 applies force to surface 730 of vacuum bag 400 based on the difference between P2 (e.g., zero pounds of pressure) and P1. This force causes vacuum bag 400 to deform and proceed into the first storage well 120. Vacuum bag 400 therefore displaces the first part 310, forcing the first part 310 out of first storage well 120 and into channel 122.

Figure 8:
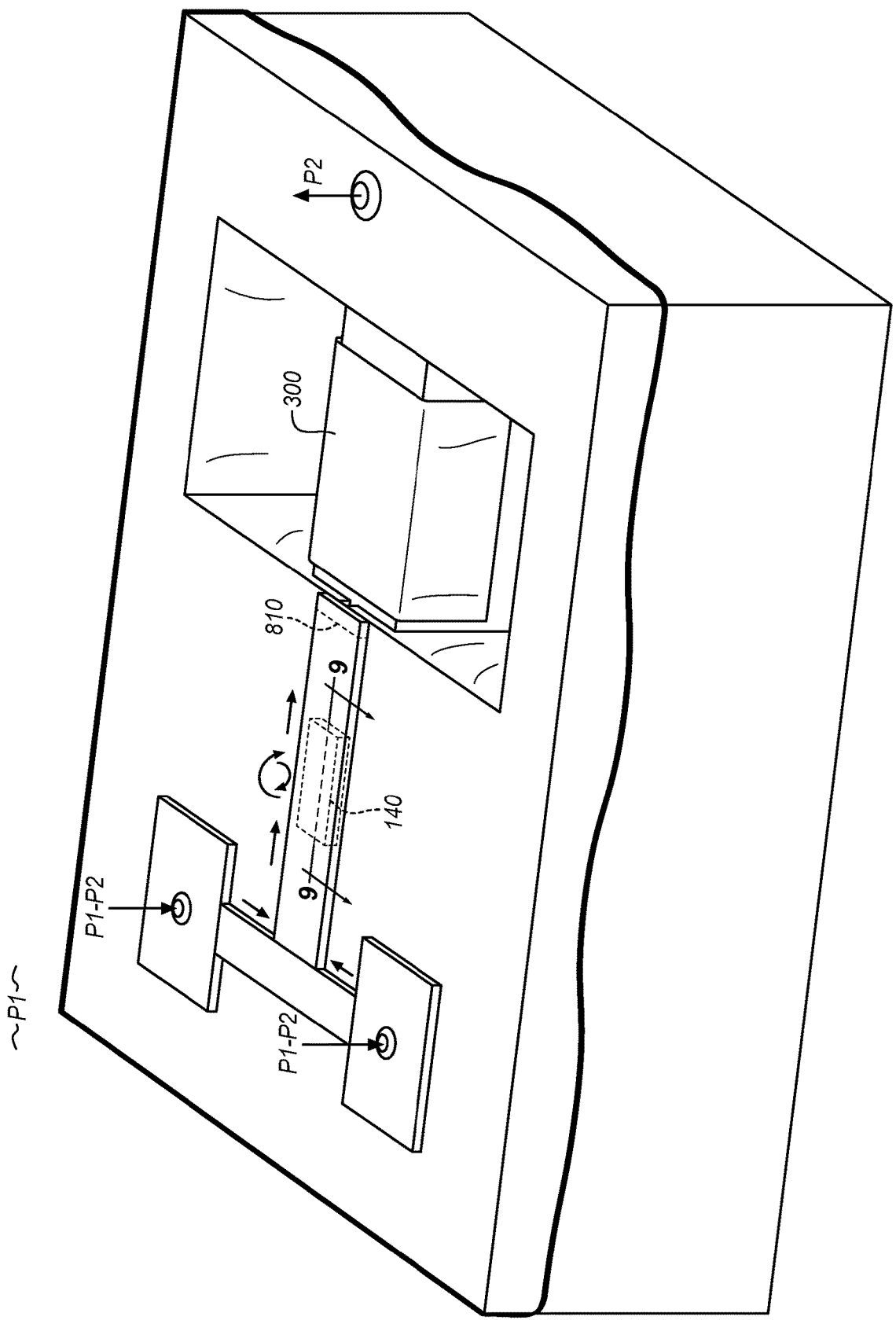
FIG. 8 illustrates parts for a resin traveling through a forming tool for a composite part in an illustrative embodiment.
Figure 9:
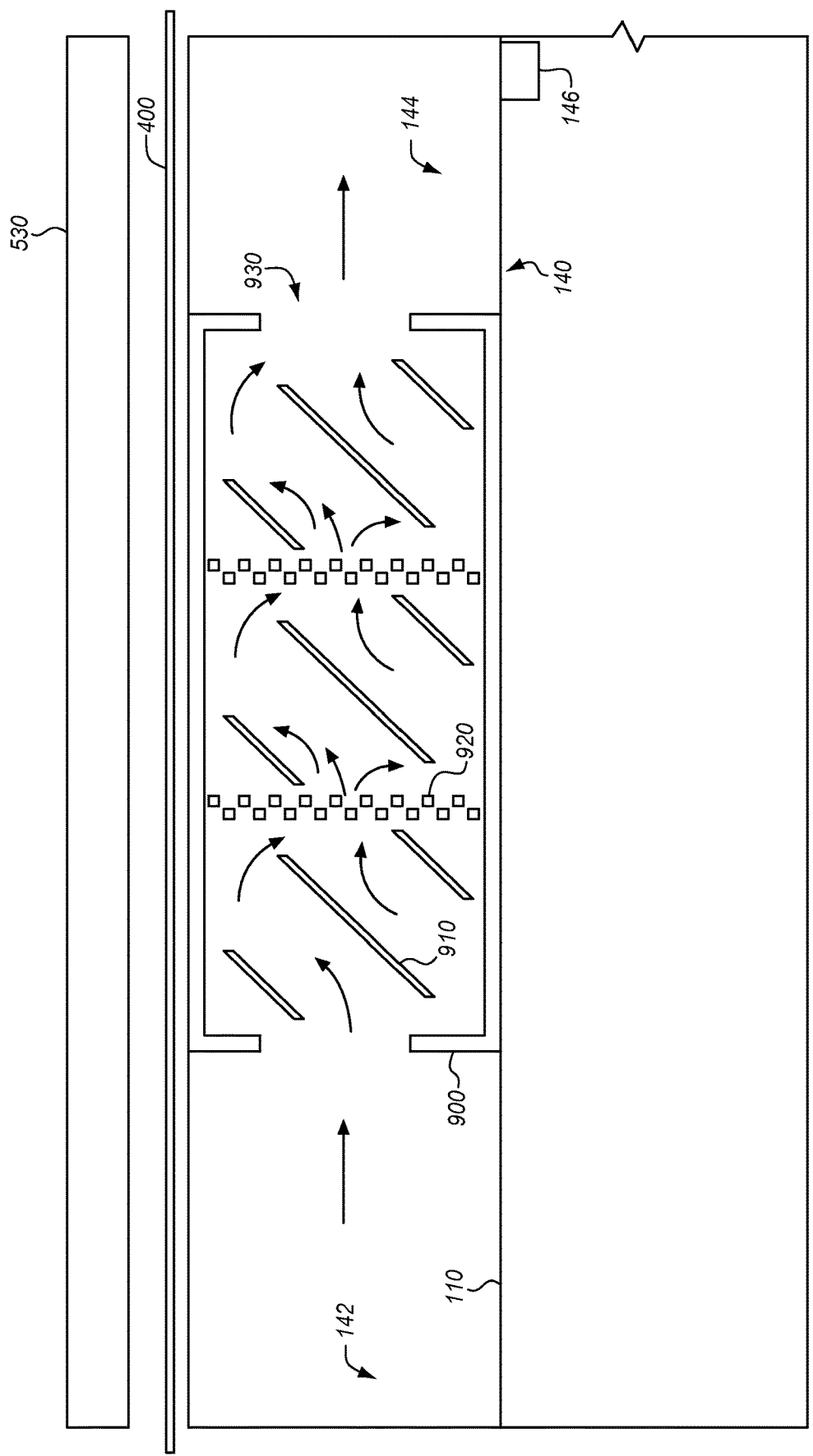
FIG. 9 is a cut-through view that illustrates parts for a resin mixing within a mixing chamber in order to form the resin in an illustrative embodiment.

In step 216, the first part 310 and the second part 320 are mixed together to form a thermoset resin within the mixing chamber 140. Wavefront 810 of FIG. 8 illustrates the thermoset resin proceeding towards the composite preform 300 after being mixed within mixing chamber 140. The parts of the thermoset resin may be mixed via an active mixing device (e.g., a rotor, chopper, etc.) or may be implemented as a static mixer having no moving parts. While the wave front advances, it is being pushed forward by each of the two parts going into the mixing chamber 140. The two parts going into the mixing chamber mix in order to form resin that comes out of the mixing chamber. The two parts are pushed forward into the mixing chamber 140 by the deformation of the vacuum bag into the storage wells as shown in FIG. 7. Hence, not all of the resin used in infusing the preform is mixed at once, but rather mixing is performed "just in time" as the wave front advances into the preform. A static mixer includes features which perturb the flow of the parts as they proceed through the mixing chamber 140. For example, as shown in FIG. 9 (which corresponds with view arrows 9 of FIG. 8), mixing chamber 140 may include a static mixer 900 defining flanges 910 and bars 920. As the first part 310 and the second part 320 proceed from the channel 142, they are perturbed and move in the directions indicated by the arrows within the static mixer 900. This causes mixing between the parts, resulting in thermoset resin 930, which exits the static mixer 900 and enters channel 144. The static mixer 900 may be a removable component, and may be disposed of after use, or cleaned via pyrolysis.

Figure 10:
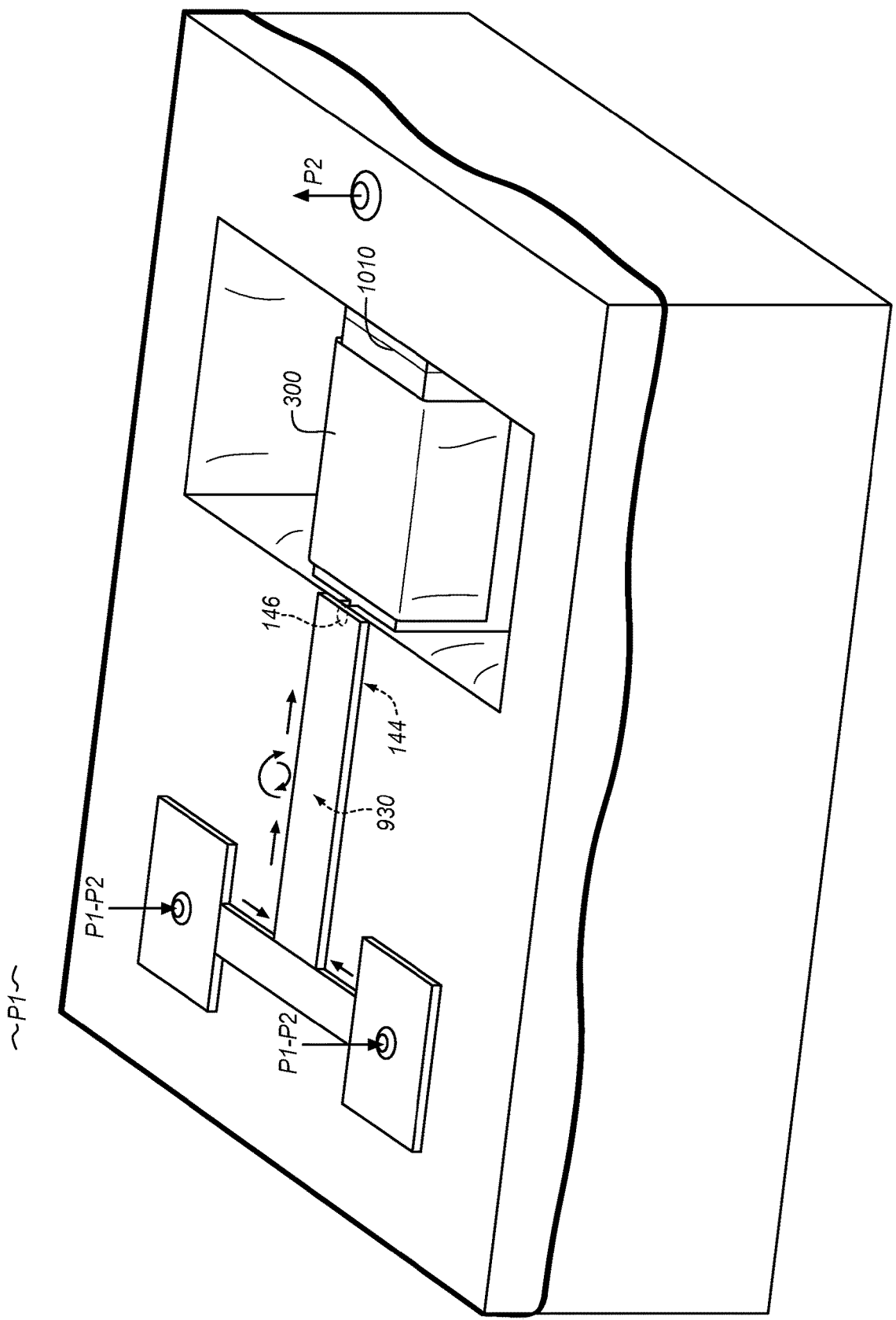
FIG. 10 illustrates resin impregnating a preform in an illustrative embodiment.

In step 218, the thermoset resin 930 is infused from the mixing chamber 140 into the composite preform 300, as shown by wavefront 1010 of FIG. 10. This impregnates the composite preform 300 with the thermoset resin 930, enabling the composite preform 300 to be cured into a composite part (e.g., via heating the composite preform 300 to a curing temperature of the thermoset resin). While traveling through the channel 144, sensor 146 may be operated to determine an amount of mixing of the two parts forming the thermoset resin (e.g., a scale and/or intensity of segregation of the parts). This may be determined, for example, based upon a color or opacity of the thermoset resin. Upon exiting the channel 144, the resin may be distributed, for example, via a mesh or other material (not shown).

Method 200 provides a technical benefit over prior systems, because it enables a single forming tool to store a reservoir of liquid for impregnating a composite preform without the risk of thermal runaway. This provides a further technical benefit by reducing the need for complicated setup procedures when fabricating composite parts.

Figure 11:
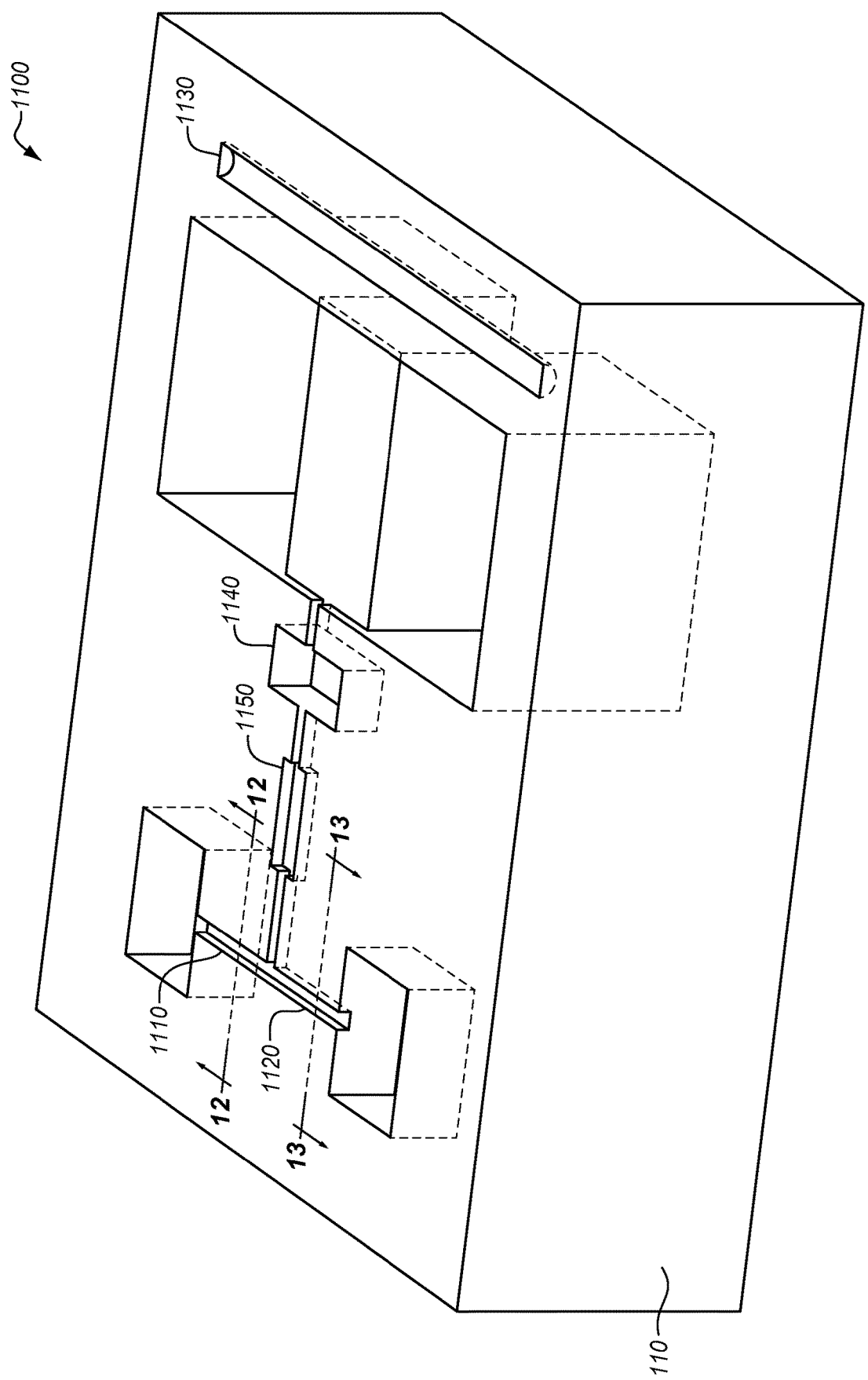
FIG. 11 illustrates a further forming tool for fabricating a composite part in an illustrative embodiment.
Figure 12:
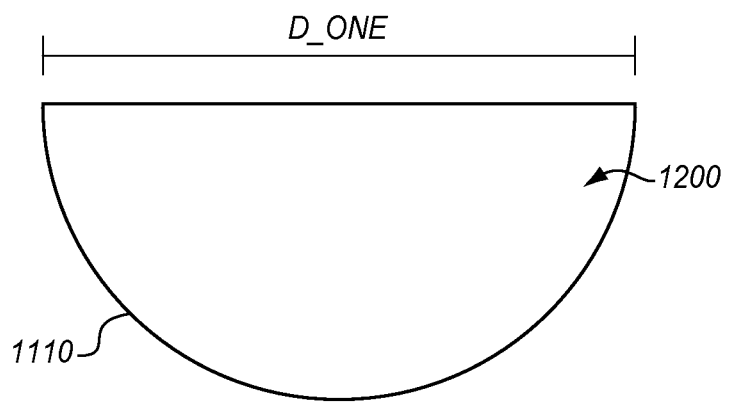
FIGS. 12-13 illustrate channels via which parts of resin traverse a forming tool in an illustrative embodiment.
Figure 13:
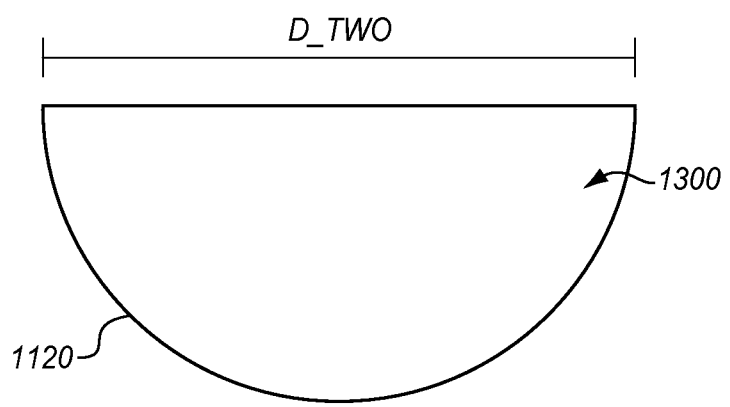

FIGS. 11-13 illustrate additional and/or alternative features for forming tools that facilitate the fabrication of composite parts. Specifically, FIG. 11 illustrates a forming tool 1100 for fabricating a composite part in an illustrative embodiment. Forming tool 1100 includes a channel 1110 and a channel 1120, which may be implemented similarly to channels at forming tool 100. Forming tool 1100 also includes additional features in the form of reserve well 1140 and overflow well 1130. Reserve well 1140 accumulates thermoset resin exiting the mixing chamber 1150. If the amount of thermoset resin exiting the mixing chamber 1150 reduces over time, then accumulated thermoset resin is drawn from within reserve well 1140 to maintain a consistent flow of thermoset resin at the forming tool 1100. In a similar fashion the amount of thermoset resin exiting the mixing chamber 1150 increases over time, then thermoset resin may be accumulated within reserve well 1140 to maintain a consistent flow. Overflow well 1130 captures excess resin leaving a composite preform. This prevents excess resin from entering and/or clogging a port of a vacuum bag.

The geometry of channel 1110 and channel 1120 are illustrated in FIG. 12 (corresponding with view arrows 12) and FIG. 13 (corresponding with view arrows 13). Both channels form semicircular troughs. However, the diameters of the channels are different. For parts having similar viscosities, the ratio of the cross-sectional area 1200 of channel 1110 (i.e., $\pi(D\_ONE/2)^2$) to the cross-sectional area 1300 of channel 1120 (i.e., $\pi(D\_TWO/2)^2$) defines the ratio at which different parts for the thermoset resin are mixed. For example, if both parts of the thermoset resin have the same viscosity and the same pressure is applied to both storage wells, the amount of flow from the storage wells is directly proportional to the ratio of the cross-sectional areas of these channels. In further embodiments, the temperatures of the storage wells may be varied with respect to each other in order to provide desired flow rates based on desired viscosities of the parts. In embodiments where the viscosities of the parts vary, it may be beneficial to ensure that both parts proceed directly into mixing chamber 1440 before meeting.

Controlling the cross-sectional area of each channel provides a technical benefit by enabling mixing ratios between the parts that are different than one to one (e.g., ratios up to ten to one). Thus, if the first part and the second part of the thermoset resin should be mixed at a mixing ratio between one to one and one to ten, the ratio of cross-sectional areas for the corresponding channels may be made equal to the mixing ratio.

In further embodiments, the volumes of the storage wells are varied based on the amount of each part that will be mixed to form the thermoset resin. For example, if a first part mixes with a second part at a ratio of two to one, a storage well for the first part may be twice as large as a storage well for the second part.

In still further embodiments, forming tools are designed to accommodate thermoset resins that are composed of more than two parts, by including more than two wells and channels leading to a mixing chamber. For example, a third storage well may be loaded with a third part of the thermoset resin that is chemically distinct from the first part of the thermoset resin and also is chemically distinct from the second part of the thermoset resin. The third part may be flowed from the third storage well towards the mixing chamber for mixing with the first part and the second part.

In yet further embodiments, ports of cover plates at the storage wells are each coupled with a different pressure source, as opposed to opening into the surrounding atmosphere. This enables the amount of pressure applied to storage wells to vary with respect to each other. Controlling these amounts of pressure enables an amount of volumetric flow from each storage well to be controlled, even if the cross-sectional areas of channels from each well are the same. Thus, if it is desirable for the first part and the second part to be mixed at a known mixing ratio, the ratio of a first pressure applied at the first storage well to a second pressure applied to the second storage well may be set equal to the mixing ratio.

EXAMPLES

In the following examples, additional processes, systems, and methods are described in the context of a forming tool for fabricating a composite part.

Figure 14:
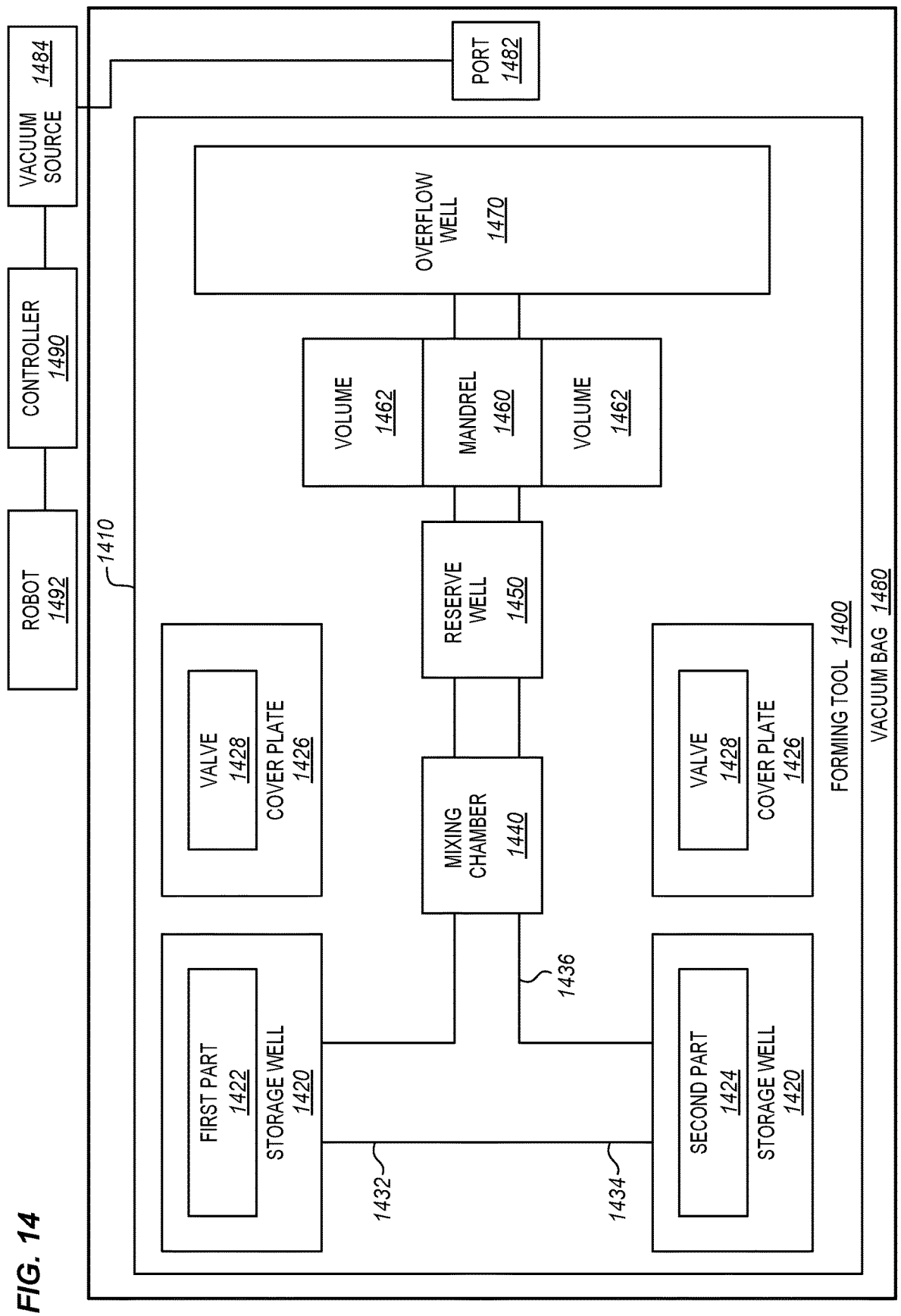
FIG. 14 is a block diagram of a forming tool for fabricating a composite part in an illustrative embodiment.

FIG. 14 is a block diagram of forming tool 1400 for fabricating a composite part in an illustrative embodiment. Body 1410 of forming tool 1400 defines storage wells 1420, which store the first part 1422 and second part 1424. First part 1422 travels via channel 1432 into mixing chamber 1440, while second part 1424 travels via channel 1434 into mixing chamber 1440. The length of channel 1436, wherein the parts travel together towards the mixing chamber 1440, may be kept short in order to prevent clogging. In further embodiments, channel 1434 and channel 1432 may proceed directly into mixing chamber 1440 without meeting in channel 1436. Mixing chamber 1449 may even be located at the ends of channel 1432 and channel 1434 such that each channel empties directly into mixing chamber 1440. Thermoset resin exiting the mixing chamber 1440 enters reserve well 1450, and then reaches mandrel 1460, which is configured to support a composite preform (not shown). Excess thermoset resin proceeds into volume 1462 or overflow well 1470. Cover plates 1426 and valves 1428 are also depicted. The cover plates 1426 are depicted as next to the storage wells instead of on top of the storage wells for the sake of illustration owing to the two dimensional nature of this block diagram.

Forming tool 1400 is covered by vacuum bag 1480, and vacuum is applied by removing gas via port 1482 in vacuum bag 1480. Vacuum source 1484 applies the vacuum pressure, and its operations are managed by controller 1490. In this embodiment, controller 1490 also controls a robot 1492 which may participate in laying up a composite preform, opening or closing valves at forming tool 1400, and placing and/or sealing the vacuum bag 1480 onto forming tool 1400. Controller 1490 may be implemented, for example, as custom circuitry, as a hardware processor executing programmed instructions, or some combination thereof.

Figure 15:
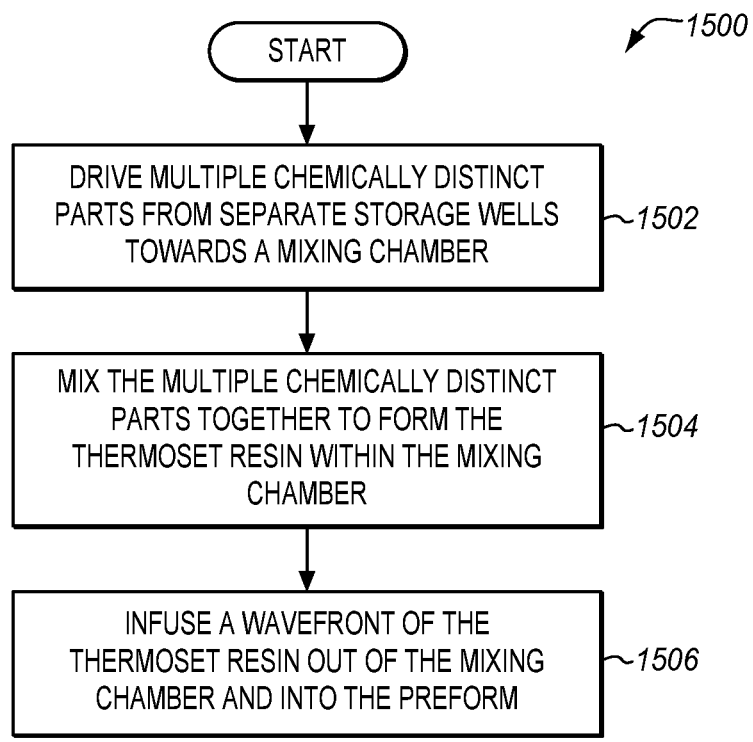
FIG. 15 is a flowchart illustrating a further method for utilizing a forming tool to fabricate a composite part in an illustrative embodiment.

FIG. 15 is a flowchart illustrating a further method for utilizing a forming tool to fabricate a composite part in an illustrative embodiment. According to FIG. 15, method 1500 includes driving multiple chemically distinct parts from separate storage wells towards a mixing chamber (step 1502), mixing the multiple chemically distinct parts together to form the thermoset resin within the mixing chamber (step 1504), and driving a wavefront of the thermoset resin out of the mixing chamber and into the preform (step 1506).

Figure 16:
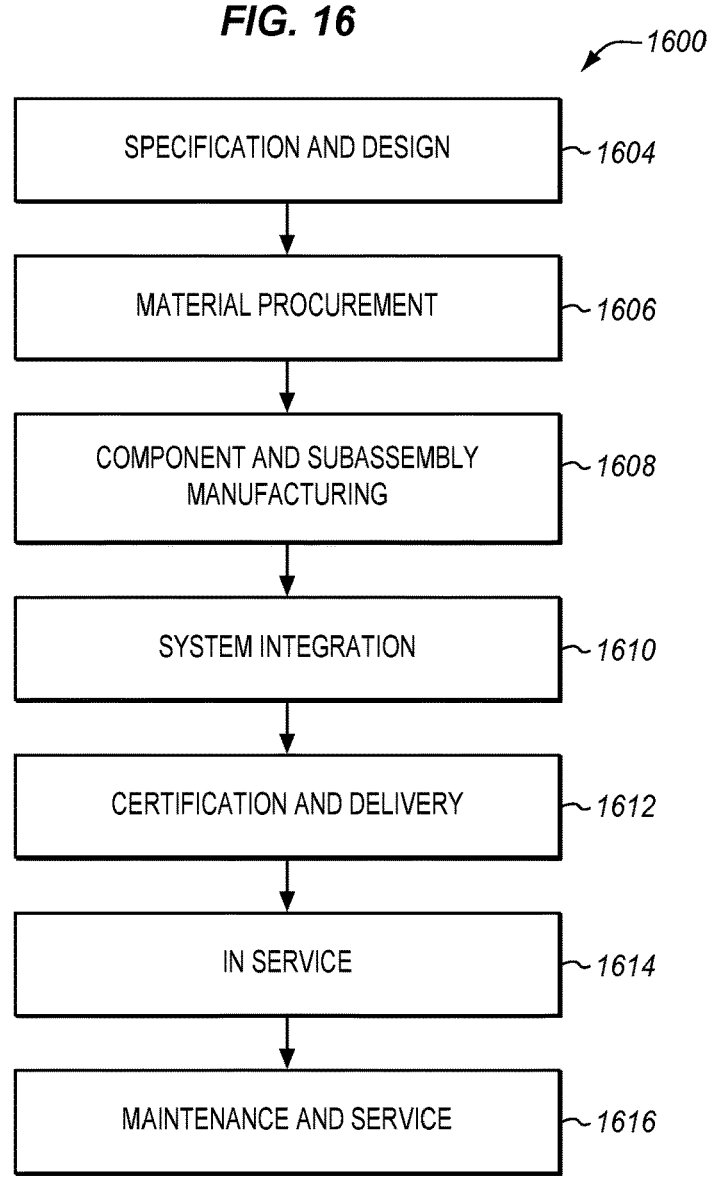
FIG. 16 is a flow diagram of aircraft production and service methodology in an illustrative embodiment.
Figure 17:
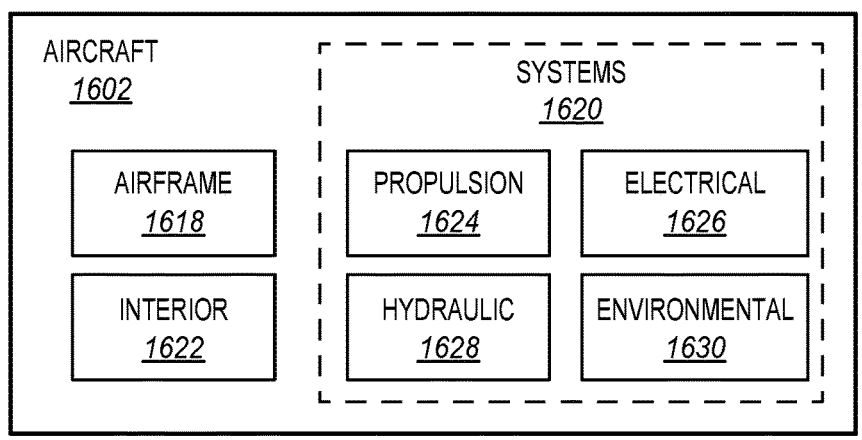
FIG. 17 is a block diagram of an aircraft in an illustrative embodiment.

Referring more particularly to the drawings, embodiments of the disclosure may be described in the context of aircraft manufacturing and service in method 1600 as shown in FIG. 16 and an aircraft 1602 as shown in FIG. 17. During pre-production, method 1600 may include specification and design 1604 of the aircraft 1602 and material procurement 1606. During production, component and subassembly manufacturing 1608 and system integration 1610 of the aircraft 1602 takes place. Thereafter, the aircraft 1602 may go through certification and delivery 1612 in order to be placed in service 1614. While in service by a customer, the aircraft 1602 is scheduled for routine work in maintenance and service 1616 (which may also include modification, reconfiguration, refurbishment, and so on). Apparatus and methods embodied herein may be employed during any one or more suitable stages of the production and service described in method 1600 (e.g., specification and design 1604, material procurement 1606, component and subassembly manufacturing 1608, system integration 1610, certification and delivery 1612, service 1614, maintenance and service 1616) and/or any suitable component of aircraft 1602 (e.g., airframe 1618, systems 1620, interior 1622, propulsion system 1624, electrical system 1626, hydraulic system 1628, environmental 1630).

Each of the processes of method 1600 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 17, the aircraft 1602 produced by method 1600 may include an airframe 1618 with a plurality of systems 1620 and an interior 1622. Examples of systems 1620 include one or more of a propulsion system 1624, an electrical system 1626, a hydraulic system 1628, and an environmental system 1630. Any number of other systems may be included. Although an aerospace example is shown, the principles of the invention may be applied to other industries, such as the automotive industry.

As already mentioned above, apparatus and methods embodied herein may be employed during any one or more of the stages of the production and service described in method 1600. For example, components or subassemblies corresponding to component and subassembly manufacturing 1608 may be fabricated or manufactured in a manner similar to components or subassemblies produced while the aircraft 1602 is in service. Also, one or more apparatus embodiments, method embodiments, or a combination thereof may be utilized during the subassembly manufacturing 1608 and system integration 1610, for example, by substantially expediting assembly of or reducing the cost of an aircraft 1602. Similarly, one or more of apparatus embodiments, method embodiments, or a combination thereof may be utilized while the aircraft 1602 is in service, for example and without limitation during the maintenance and service 1616. For example, the techniques and systems described herein may be used for material procurement 1606, component and subassembly manufacturing 1608, system integration 1610, service 1614, and/or maintenance and service 1616, and/or may be used for airframe 1618 and/or interior 1622. These techniques and systems may even be utilized for systems 1620, including, for example, propulsion system 1624, electrical system 1626, hydraulic 1628, and/or environmental system 1630.

In one embodiment, a part comprises a portion of airframe 1618, and is manufactured during component and subassembly manufacturing 1608. The part may then be assembled into an aircraft in system integration 1610, and then be utilized in service 1614 until wear renders the part unusable. Then, in maintenance and service 1616, the part may be discarded and replaced with a newly manufactured part. Inventive components and methods may be utilized throughout component and subassembly manufacturing 1608 in order to manufacture new parts.

Any of the various control elements (e.g., electrical or electronic components) shown in the figures or described herein may be implemented as hardware, a processor implementing software, a processor implementing firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Also, a control element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Although specific embodiments are described herein, the scope of the disclosure is not limited to those specific embodiments. The scope of the disclosure is defined by the following claims and any equivalents thereof.

What is claimed is:

1. A method for mixing parts of a thermoset resin during impregnation of a composite preform, the method comprising:
   loading a first storage well at a forming tool with a first part of the thermoset resin;
   loading a second storage well at the forming tool with a second part of the thermoset resin;
   positioning a composite preform at the forming tool;
   positioning a vacuum bag atop the first storage well, the second storage well, a mixing chamber, and the composite preform;
   sealing a first cover plate atop the vacuum bag over the first storage well;
   sealing a mixer plate atop the vacuum bag over the mixing chamber;
   flowing the first part of the thermoset resin into a mixing chamber at the forming tool via channels;
   flowing the second part of the thermoset resin that is chemically distinct from the first part of the thermoset resin into the mixing chamber via the channels;
   mixing the first part of the thermoset resin and the second part of the thermoset resin to form the thermoset resin within the mixing chamber; and
   infusing the thermoset resin from the mixing chamber into the composite preform.

2. The method of claim 1 further comprising:
   applying a vacuum via the vacuum bag while a first valve in the first cover plate remains in a closed position.

3. The method of claim 2 wherein:
   the first part of the thermoset resin and the second part of the thermoset resin are mixed at a mixing ratio between one to one and one to ten, a first channel of the channels proceeding from the first storage well to the mixing chamber has a first cross-sectional area, a second channel of the channels proceeding from the second storage well to the mixing chamber has a second cross-sectional area, and a ratio of the first cross-sectional area to the second cross-sectional area is equal to the mixing ratio.

4. The method of claim 2 wherein:
   the first part of the thermoset resin and the second part of the thermoset resin are mixed at a mixing ratio between one to one and one to ten; and a ratio of a first pressure applied at the first storage well to a second pressure applied to the second storage well is equal to the mixing ratio.

5. The method of claim 2 further comprising:
loading a third storage well at the forming tool with a third part of the thermoset resin that is chemically distinct from the first part of the thermoset resin and also is chemically distinct from the second part of the thermoset resin; and
flowing the third part from the third storage well into the mixing chamber, wherein:
mixing the first part of the thermoset resin and the second part of the thermoset resin within the mixing chamber also comprises mixing the third part of the thermoset resin.

6. The method of claim 2 further comprising:
sealing a second cover plate atop the vacuum bag over the second storage well; and
opening the first valve in the first cover plate that enables gas to reach the vacuum bag and opening a second valve in the second cover plate that enables gas to reach the vacuum bag, in response to the composite preform being compacted by the vacuum.

7. The method of claim 1 further comprising:
drawing the thermoset resin from the mixing chamber to a reserve well, disposed between the mixing chamber and the composite preform.

8. The method of claim 1 further comprising:
operating a sensor to determine an amount of mixing of the first part of the thermoset resin and the second part of the thermoset resin.

9. The method of claim 1 further comprising:
driving the first part of the thermoset resin and the second part of the thermoset resin through the channels into the mixing chamber; and
driving the thermoset resin from the mixing chamber into the composite preform.

10. The method of claim 1 further comprising:
controlling vacuum pressure to drive the first part of the thermoset resin and the second part of the thermoset resin into the mixing chamber, and to drive the thermoset resin into the composite preform.

11. The method of claim 1 wherein:
the mixing is performed via a static mixer.

12. The method of claim 1 wherein:
the mixing is performed via an active mixing device.

13. The method of claim 1 wherein:
the first part of the thermoset resin comprises a liquid suspension of monomers.

14. The method of claim 13 wherein:
the second part of the thermoset resin comprises a liquid hardener that catalyzes polymerization of the monomers.

15. A method for infusing a preform with a thermoset resin, the method comprising:
positioning a vacuum bag atop a first storage well containing a first part of the thermoset resin, a second storage well containing a second part of the thermoset resin that is distinct from the first part of the thermoset resin, and a mixing chamber;
sealing a cover plate to the vacuum bag over the first storage well and the second storage well;
sealing a mixer plate to the vacuum bag over the mixing chamber;
applying a vacuum via the vacuum bag while a valve in the cover plate remains in a closed position in order to compact the preform;
driving the first part of the thermoset resin from the first storage well and the second part of the thermoset resin that is distinct from the first part of the thermoset resin from the second storage well towards the mixing chamber via channels;
mixing the first part of the thermoset resin and the second part of the thermoset resin together to form the thermoset resin within the mixing chamber; and
infusing a wavefront of the thermoset resin out of the mixing chamber and into the preform.

16. The method of claim 15 wherein:
the method is performed within a forming tool for a composite part.

17. The method of claim 15 further comprising:
actively mixing the first part of the thermoset resin and the second part of the thermoset resin within the mixing chamber via an active mixing device.

18. The method of claim 15 wherein:
the first part of the thermoset resin comprises a liquid suspension of monomers, and the second part of the thermoset resin comprises a liquid hardener that catalyzes polymerization of the monomers.

19. A system for mixing parts of a thermoset resin during impregnation of a composite preform, the system comprising:
a forming tool comprising:
a mandrel defining a shape for the composite preform;
a first storage well that stores a first part of the thermoset resin;
a second storage well that stores a second part of the thermoset resin which is chemically distinct from the first part of the thermoset resin;
a mixing chamber;
a first channel leading from the first storage well to the mixing chamber;
a second channel leading from the second storage well to the mixing chamber, wherein the composite preform is spaced from the first storage well and the second storage well by the first channel and the second channel and by a third channel leading from the mixing chamber to the composite preform;
a vacuum bag positioned atop the first storage well, the second storage well, the mixing chamber, and the composite preform;
a first cover plate sealed on the vacuum bag over the first storage well;
a second cover plate sealed on the vacuum bag over the second storage well; and
a mixer plate sealed on the vacuum bag over the mixing chamber.

20. The system of claim 19, wherein the forming tool further comprises: a reserve well disposed between the mixing chamber and the composite preform.

21. The system of claim 19, wherein the forming tool further comprises: a sensor configured to determine an amount of mixing of the first part of the thermoset resin and the second part of the thermoset resin.

22. The system of claim 19, wherein the mixing chamber comprises a static mixer.

23. The system of claim 19, wherein the mixing chamber comprises an active mixing device.

* * * * *